(12) United States Patent
Hartwig et al.

(10) Patent No.: US 7,868,762 B2
(45) Date of Patent: Jan. 11, 2011

(54) WIRELESS ASSOCIATION

(75) Inventors: Stephan Hartwig, Essen (DE); Georg Ullenboom, Bochum (DE)

(73) Assignee: Nokia Corporation, Espoo (FI)

( * ) Notice: Subject to any disclaimer, the term of this patent is extended or adjusted under 35 U.S.C. 154(b) by 468 days.

(21) Appl. No.: 11/954,750

(22) Filed: Dec. 12, 2007

(65) Prior Publication Data

US 2009/0153327 A1    Jun. 18, 2009

(51) Int. Cl.
*G08B 13/14* (2006.01)
(52) U.S. Cl. .............. 340/572.1; 340/572.4; 340/572.7; 340/572.8; 235/375; 235/385; 235/492; 235/462.46
(58) Field of Classification Search .............. 340/572.1, 340/572.4, 572.7, 572.8; 235/375, 385, 492, 235/462.46
See application file for complete search history.

(56) References Cited

U.S. PATENT DOCUMENTS

| | | | |
|---|---|---|---|
| 7,309,015 B2 * | 12/2007 | Frantz et al. | 235/462.46 |
| 2003/0134679 A1 * | 7/2003 | Siegel et al. | 463/43 |
| 2008/0228503 A1 * | 9/2008 | Buchheit | 705/1 |

* cited by examiner

*Primary Examiner*—Tai T Nguyen
(74) *Attorney, Agent, or Firm*—Locke Lord Bissell & Liddell (57) ABSTRACT

A system for determining compatibility between various items is disclosed. A wireless communication device is used to scan a machine-readable tag which includes a plurality of information fields. The information fields include at least identification information of the primary object to which the tag is affixed, list of compatible items, characteristic information of the primary object or other objects, etc. The scanned information from the tag is compared to information in other tags. If the at least some of the information in the tag affixed to the primary object matches the information in one or more other tags, a notification event is triggered to inform the user of the match.

27 Claims, 6 Drawing Sheets

WIRELESS ASSOCIATION

BACKGROUND

1. Field of Invention

The present invention relates to a system for facilitating wireless communication, and more specifically, to a system for controlling a wireless communication device in determining whether there is an association between various tagged items.

2. Background

A wireless communication device (WCD) may communicate over a multitude of networks. Cellular networks facilitate WCD communications over large geographic areas. For example, the Global System for Mobile Telecommunications (GSM) is a widely employed cellular network that communicates in the 900 MHZ-1.8 GHZ band in Europe and at 1.9 GHZ in the United States. This system provides a multitude of features including audio (voice), video and textual data communication. For example, the transmission of textual data may be achieved via the Short Messaging Service (SMS). SMS allows a WCD to transmit and receive text messages of up to 160 characters. It also provides data transfer to packet networks, ISDN and POTS users at 9.6 Kbps. While cellular networks like GSM provide a global means for transmitting and receiving data, due to cost, traffic and legislative concerns, a cellular network may not be appropriate for all data applications.

More recently, manufacturers have begun to incorporate various devices for providing enhanced functionality in a WCD (e.g., hardware components and software for performing close-proximity wireless information exchanges). Sensors and/or scanners may be used to read visual or electronic information into a device. A transaction may involve a user holding their WCD in proximity to a target, aiming their WCD at an object (e.g., to take a picture), sweeping the device over a tag or document, etc. Machine-readable technologies such as radio frequency identification (RFID), Infra-red (IR) communication, optical character recognition (OCR) and various other types of visual, electronic and magnetic scanning are used to quickly input desired information into the WCD without the need for manual entry by a user.

For example, a user wishing to purchase or acquire information about a product may simply sweep the WCD over a tag attached or affixed to the product. In addition, the user may also be interested in purchasing additional accessories to be used with the product. However, currently there are no user-friendly means for determining compatibility of such accessories. The user must resort to reading packaging labels and product documentation to determine whether the item/accessory is compatible with the desired product. Non-technical users must try to determine whether high-tech devices are compatible, often ending up with the user buying and trying to implement an incompatible solution.

SUMMARY OF INVENTION

Exemplary embodiments of the present invention may include at least a method, apparatus, tag, computer program and system for triggering an event in a WCD through recognition of scanned information. In at least one embodiment, a scanner incorporated within the device may be utilized to scan a machine-readable tag affixed to an object. The scanning of the tag may set at least one selection criteria in the WCD. The scanner may also be utilized to scan one or more other tags which include at least characteristic information about the object to which the tag is affixed. The device may compare the selection criteria to the characteristic information and trigger an event in the device if the characteristic information corresponds to the selection criteria.

In at least one embodiment of the present invention, the machine-readable tag may include at least a machine-readable data retention component including at least one information field including identification information for the object to which the tag is affixed and at least one information field including association information for identifying other objects that can be used or are associated with the object to which the tag is affixed.

DESCRIPTION OF DRAWINGS

The invention will be further understood from the following detailed description of one or more embodiments, taken in conjunction with appended drawings, in which.

DESCRIPTION OF EMBODIMENTS

While the invention has been described in one or more embodiments, various changes can be made therein without departing from the spirit and scope of the invention, as described in the appended claims.

I. Wireless Communication Over Different Communication Networks

Figure 1:
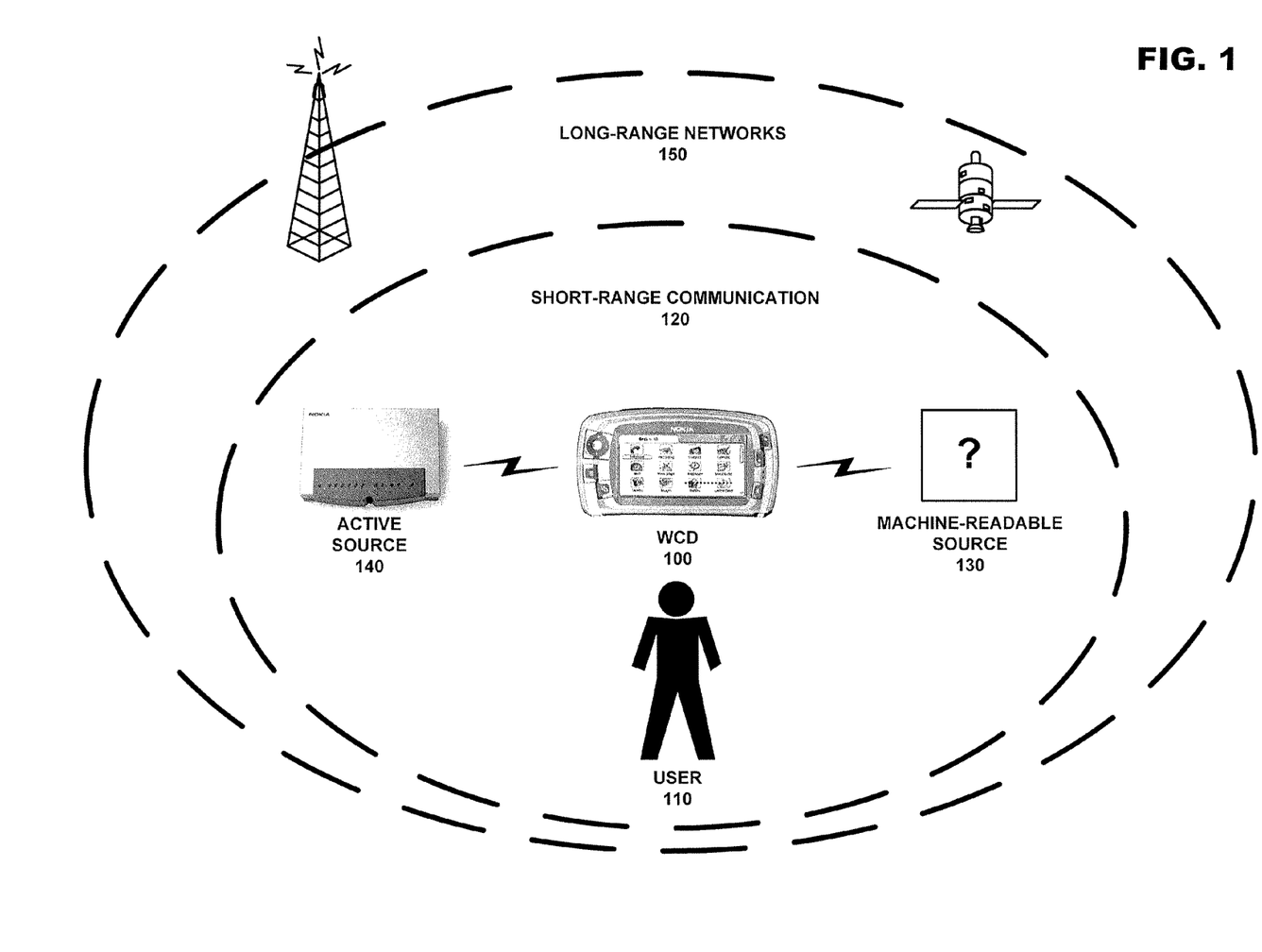
FIG. 1 discloses an exemplary short-range to long-range wireless communication environment in accordance with at least one embodiment of the present invention.

A WCD may both transmit and receive information over a wide array of wireless communication networks, each with different features regarding speed, range, quality (error correction), security (encoding), etc. These characteristics will dictate the amount of information that may be transferred to a receiving device, and the duration of the information transfer. FIG. 1 includes a diagram of a WCD and how it interacts with various types of wireless networks.

In FIG. 1, wherein at least one embodiment of the invention is described, user 110 possesses an exemplary WCD 100. This device 100 may be, for example, a cellular phone, a mobile communication device, a PDA (Personal Digital Assistant), an audio/video player, a digital camera/camcorder, a positioning device like a GPS device (Global Positioning System), a mobile radio/TV device a wirelessly enabled palmtop or laptop computer, etc., or any combination of the aforementioned. Various types of communication may be supported by WCD 100, including the depicted example classifications of short-range communication 120 and long-range networks 150. Short-range communication 120 may include a multitude of devices communicating over various wireless mediums. These devices and mediums may be selected for certain scenarios based on their characteristics, such as operational range, speed, error correction, complexity of implementation, security, etc. For example, machine-readable sources 130 may include various transponder-type interactions wherein normally only the scanning device requires its own power source. WCD 100 scans source 130 via short-range communication. A transponder in source 130 may use the energy and/or clock signal contained within the scanning signal, as in the case of RFID communication, to respond with data stored in the transponder. These types of technologies usually have an effective transmission range on the order of ten feet, and may be able to deliver stored data in amounts from a bit to over a megabit (or 125 Kbytes) relatively quickly. These features make such technologies well suited for identification purposes, such as to receive and/or transmit information or data such as, product information, personal profiles, personal images, restaurant coupons, location directions, pass codes, passwords, etc.

The transmission range between two devices may be extended if both devices are capable of performing powered communication. For example, short-range active sources 140 may include applications wherein the sending and receiving devices are both active. An exemplary situation would include user 110 coming within effective transmission range of a Bluetooth™, Wireless Local Area Network (WLAN), Ultra Wide Band (UWB), Wireless Universal Serial Bus (WUSB), Infrared Data Association (IrDA), Wibree™, etc. access point. In the case of Bluetooth™, a network may automatically be established to transmit information to WCD 100 possessed by user 110. The amount of information to be conveyed is unlimited, except that it may be transferred in the time when user 110 is within effective transmission range of the access point. Due to the higher complexity of these wireless networks, additional time is also required to establish the initial connection to WCD 100, which may be increased if many devices are queued for service in the area proximate to the access point. The effective transmission range of these networks depends on the technology, and may be from some 30 ft. to over 300 ft. with additional power boosting.

Long-range networks 150 may be used to provide virtually uninterrupted communication coverage for WCD 100. Land-based radio stations or satellites may be utilized to relay various communication transactions worldwide. While these systems are extremely functional, the use of these systems is often charged on a per-minute basis to user 110, not including additional charges for data transfer (e.g., wireless Internet access).

II. Wireless Communication Device

As previously described, the present invention may be implemented using a variety of wireless communication equipment. Therefore, it is important to understand the communication tools available to user 110 before exploring the present invention. For example, in the case of a cellular telephone or other handheld wireless devices, the integrated data handling capabilities of the device play an important role in facilitating transactions between the transmitting and receiving devices.

Figure 2:
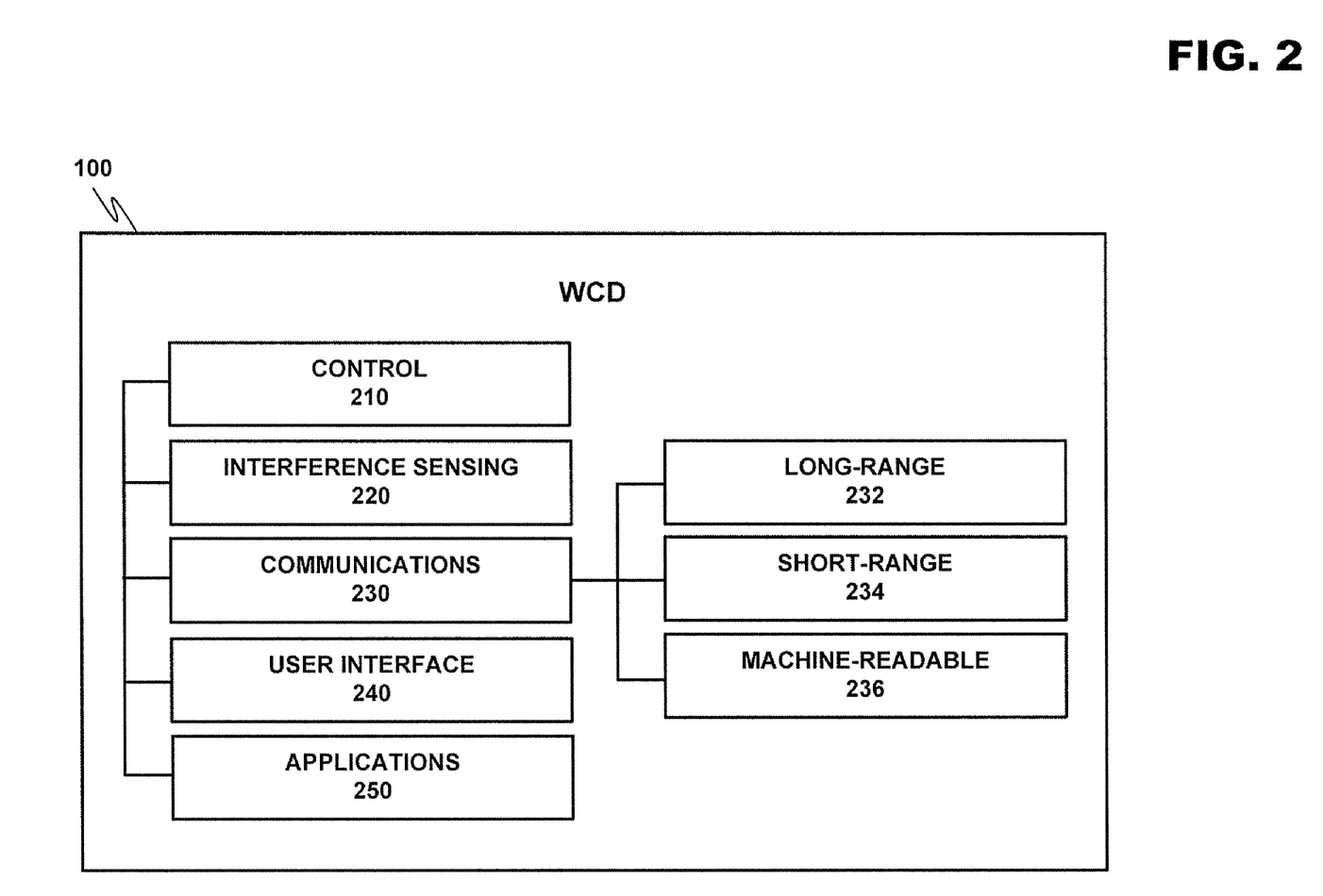
FIG. 2 discloses a modular description of an exemplary wireless communication device in accordance with at least one embodiment of the present invention.

FIG. 2, in accordance with at least one embodiment of the present invention, discloses an exemplary modular layout for a wireless communication device usable with the present invention. WCD 100 is broken down into modules representing the functional aspects of the device. These functions may be performed by the various combinations of software and/or hardware components discussed below.

Control module 210 regulates the operation of the device. Inputs may be received from various other modules included within WCD 100. For example, interference sensing module 220 may use various techniques known in the art to sense sources of environmental interference within the effective transmission range of the wireless communication device. Control module 210 interprets these data inputs, and in response, may issue control commands to the other modules in WCD 100.

Communications module 230 may incorporate the communications aspects of WCD 100. As shown in FIG. 2, communications module 230 may include, for example, wireless long-range communications module 232, wireless short-range communications module 234 and wireless machine-readable communications module 236. Communications module 230 utilizes at least these sub-modules to receive a multitude of different types of communication from both local and long distance sources, and to transmit data to recipient devices within the transmission range of WCD 100. Communications module 230 may be triggered by control module 210, or by control resources local to the module responding to sensed messages, environmental influences and/or other devices in proximity to WCD 100.

User interface module 240 may include visual, audible and tactile elements which allow the user 110 to receive data from, and enter data into, the device. The data entered by user 110 may be interpreted by control module 210 to affect the behavior of WCD 100. User-inputted data may also be transmitted by communications module 230 to other devices within effective transmission range. Other devices in transmission range may also send information to WCD 100 via communications module 230, and control module 210 may cause this information to be transferred to user interface module 240 for presentment to the user.

Applications module 250 may incorporate all other hardware and/or software applications on WCD 100. These applications may include sensors, interfaces, utilities, interpreters, data applications, productivity applications, entertainment applications, etc., and may be invoked by control module 210 to read information provided by the various modules and in turn supply information to requesting modules in WCD 100.

Figure 3:
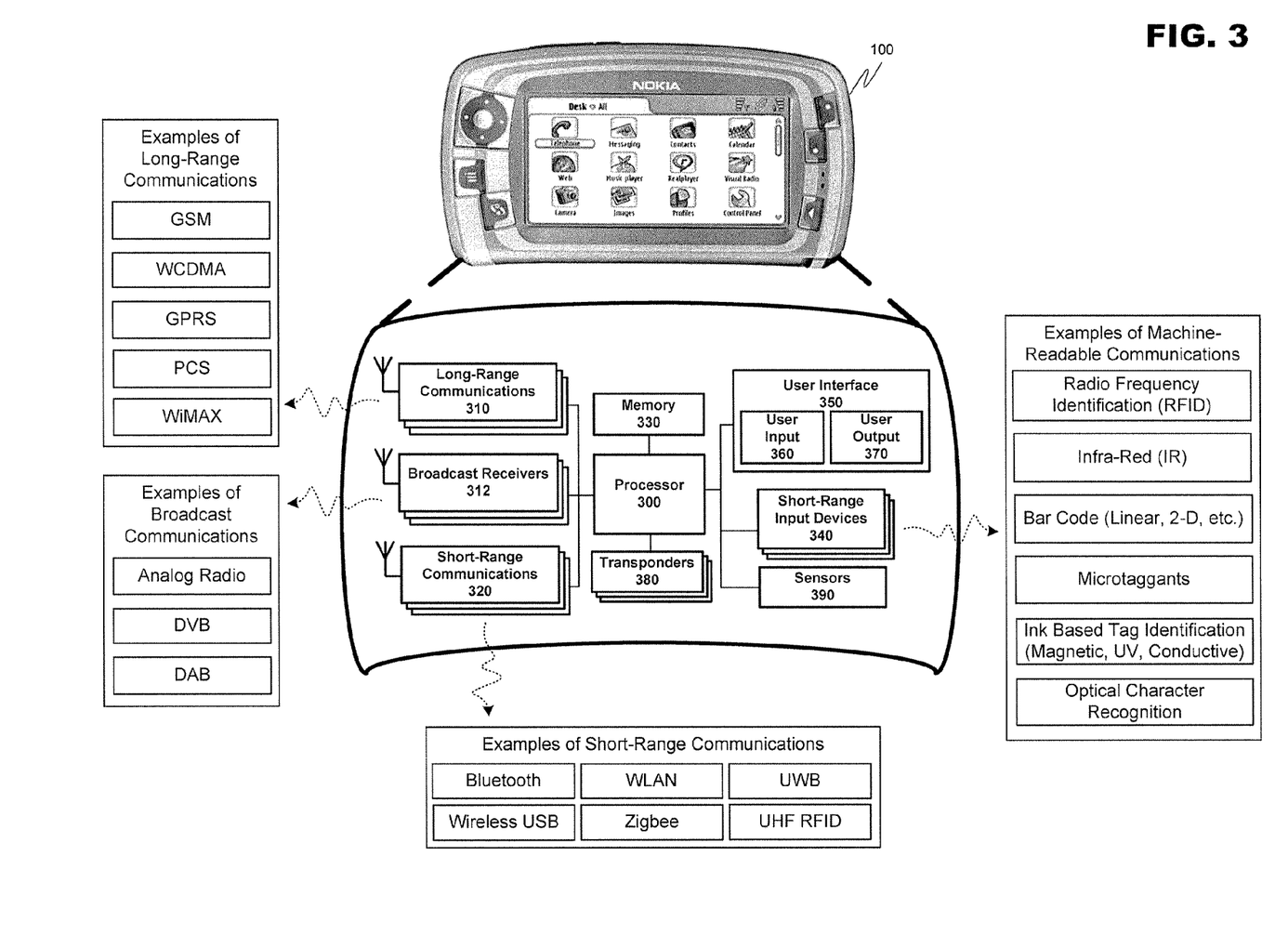
FIG. 3 discloses, in accordance with at least one embodiment of the present invention, an exemplary structural description of the wireless communication device previously described in FIG. 2.

FIG. 3, describing at least one embodiment of the present invention, discloses an exemplary structural layout of WCD 100 according to an embodiment of the present invention that may be used to implement the functionality of the modular system previously described in FIG. 2. Processor 300 controls overall device operation. As shown in FIG. 3, processor 300 is coupled to at least communications sections 310, 320 and 340 having one or more transceivers. Processor 300 may be implemented with one or more microprocessors that are each capable of executing software instructions stored in memory 330.

Memory 330 may include random access memory (RAM), read only memory (ROM), and/or flash memory, and stores information in the form of data and software components (also referred to herein as modules). The data stored by memory 330 may be associated with particular software components. In addition, this data may be associated with databases, such as a bookmark database or a business database for scheduling, email, etc.

The software components stored by memory 330 include instructions that can be executed by processor 300. Various types of software components may be stored in memory 330. For instance, memory 330 may store software components that control the operation of communication sections 310, 320 and 340. Memory 330 may also store software components including a firewall, a service guide manager, a bookmark database, user interface manager, and any communications utilities modules required to support WCD 100.

Long-range communications 310 performs functions related to the exchange of information over large geographic areas (such as cellular networks) via an antenna. These communication methods include technologies from the previously described 1G to 3G. In addition to basic voice communications (e.g., via GSM), long-range communications 310 may operate to establish data communications sessions, such as General Packet Radio Service (GPRS) sessions and/or Universal Mobile Telecommunications System (UMTS) sessions. Also, long-range communications 310 may operate to transmit and receive messages, such as short messaging service (SMS) messages and/or multimedia messaging service (MMS) messages. Further, the wireless media specifically-identified above are presented only for the sake of explanation in the disclosure. The present invention is not limited to the aforementioned types of wireless communication media, and may be applicable to any wireless or wired communication medium.

As a subset of long-range communications 310, or alternatively operating as an independent module separately connected to processor 300, broadcast receiver 312 allows WCD 100 to receive transmission messages via broadcast mediums such as Digital Video Broadcast (DVB). These transmissions may be encoded so that only certain designated receiving devices may access the transmission content, and may contain text, audio or video information. In at least one example, WCD 100 may receive these transmissions and use information contained within the transmission signal to determine if the device is permitted to view the received content.

Short-range communications 320 is responsible for functions involving the exchange of information across short-range wireless networks. As described above and depicted in FIG. 3, examples of such short-range communications 320 are not limited to Bluetooth™, WLAN, UWB and Wireless USB connections. Accordingly, short-range communications 320 performs functions related to the establishment of short-range connections, as well as processing related to the transmission and reception of information via such connections.

Short-range input device 340, also depicted in FIG. 3, may provide functionality related to the short-range scanning of machine-readable data. For example, processor 300 may control short-range input device 340 to generate RF signals for activating an RFID transponder, and may in turn control the reception of signals from an RFID transponder. Other short-range scanning methods for reading machine-readable data that may be supported by the short-range input device 340 are not limited to IR communications, linear and 2-D (e.g., QR) bar code readers (e.g., including processes related to the interpretation of Universal Product Code labels, also known as "UPC" labels), and optical character recognition devices for reading magnetic, UV, conductive or other types of coded data that may be provided in a tag using suitable ink. In order for short-range input device 340 to scan the aforementioned types of machine-readable data, the input device may include optical detectors, magnetic detectors, CCDs or other sensors known in the art for interpreting machine-readable information.

As further shown in FIG. 3, user interface 350 is also coupled to processor 300. User interface 350 facilitates the exchange of information with a user. FIG. 3 shows that user interface 350 includes a user input 360 and a user output 370. User input 360 may include one or more components that allow a user to input information. Examples of such components include keypads, touch screens, and microphones. User output 370 allows a user to receive information from the device. Thus, user output portion 370 may include various components, such as a display, light emitting diodes (LED), tactile emitters and one or more audio speakers. Exemplary displays include liquid crystal displays (LCDs), and other video displays.

WCD 100 may also include one or more transponders 380. This is a passive device that may be programmed by processor 300 with information to be delivered in response to a scan from an outside source. For example, an RFID scanner mounted in an entryway may continuously emit radio frequency waves. When a person with a device containing transponder 380 walks through the door, the transponder is energized and may respond with information identifying the device, the person, etc. Alternatively, a scanner may be mounted in the WCD so that it can read information from other transponders in the vicinity (this specific interface has been omitted from the figure in order to provide a simplified drawing).

It is important to note that the scope of the functionality of an exemplary mobile device utilized in accordance with at least one embodiment of the present invention need not have all of, or could indeed add additional features to, the previously discussed components and interfaces. The mobile device previously described above is but one example of a usable device.

Hardware corresponding to communications sections 310, 312, 320 and 340 provide for the transmission and reception of signals. Accordingly, these portions may include components (e.g., electronics) that perform functions, such as modulation, demodulation, amplification, and filtering. These portions may be locally controlled, or controlled by processor 300 in accordance with software communications components stored in memory 330.

The elements shown in FIG. 3 may be constituted and coupled according to various techniques in order to produce the functionality described in FIG. 2. One such technique involves coupling separate hardware components corresponding to processor 300, communications sections 310, 312 and 320, memory 330, short-range input device 340, user interface 350, transponder 380, etc. through one or more bus interfaces (which may be wired or wireless bus interfaces). Alternatively, any and/or all of the individual components, or additional components, may be replaced by an integrated circuit in the form of a programmable logic device, gate array, ASIC, multi-chip module, etc. programmed to replicate the functions of the stand-alone devices. In addition, each of these components is coupled to a power source, such as a removable and/or rechargeable battery (not shown).

The user interface 350 may interact with a communications utilities software component, also contained in memory 330, which provides for the establishment of service sessions using long-range communications 310 and/or short-range communications 320. The communications utilities component may include various routines that allow the reception of services from remote devices according to mediums such as the Wireless Application Medium (WAP), Hypertext Markup Language (HTML) variants like Compact HTML (CHTML), etc.

III. Exemplary Operation of a Wireless Communication Device.

In accordance with at least one embodiment of the present invention, WCD 100 may be utilized to scan machine-readable tags which include one or more information fields. Alternatively, or in addition to scanning the tags, WCD 100 may communicate with the tags or objects to which the tags are affixed via NFC peer-to-peer communication, e.g. using the International Standard ISO/IEC 18092, Near Field Communication Interface and Protocol (NFCIP-1). The information fields may include information such as, for example, identification information for the primary object or item to which the tag is affixed and association information. Association information may include at least identification information of other objects or items which are compatible or associated with the primary object. Once the tag of an object is scanned, the information read from the tag may be stored in the WCD 100. Alternatively, or in addition to scanning a tag, information relating to either the primary object or the object being searched may be manually input into WCD 100 or may be downloaded from a network.

WCD 100 may compare the information read from the tag affixed to the primary object with information read from subsequently scanned tags. If the identification information of the primary object corresponds to the association information of one or more objects affixed to the subsequently scanned tags or if the association information of the primary object corresponds to the identification information of one or more objects affixed to the subsequently scanned tags, then WCD 100 may trigger a notification event such as playing a sound and/or displaying a notification to indicate the correspondence.

In accordance with an exemplary embodiment, correspondences may include full matches or partial matches. A full match may occur, for example, when the identification information of the primary object matches the association information of the object affixed to the subsequently scanned tag, indicating that the object is compatible or usable with the primary object. Similarly, a full match may also occur when the association information of the primary object matches the identification information of the object affixed to the subsequently scanned tag. A partial match may occur, for example, when the identification information of the primary object matches a part of the association information of the object affixed to the subsequently scanned tag or when the association information of the primary object matches a part of the identification information of the object affixed to the subsequently scanned tag. A partial match may indicate that the object to which the subsequently scanned tag is affixed is a member of the same class or group as the primary object but may not be fully compatible.

In accordance with an exemplary embodiment, WCD 100 may create association tables to determine correspondence between information read from the tags. For example, WCD 100 may store information read from the tag of a primary object and the information read from subsequently scanned tags in the form of a table. The stored information may include identification information of the primary object, list of compatible objects or items, characteristic information of the primary object or compatible objects, etc. If the identification or association information of the primary object at least partially matches the association or identification information, respectively, of one or more other objects, then WCD 100 may trigger a notification event to inform the user of the match. In accordance with at least one embodiment, WCD 100 may include various levels of notifications depending on the type of match (i.e., full or partial match). For example, for a partial match, WCD 100 may only display a notification on the screen but for a full match, WCD 100 may display a notification on the screen as well as play a sound.

Figure 4A:
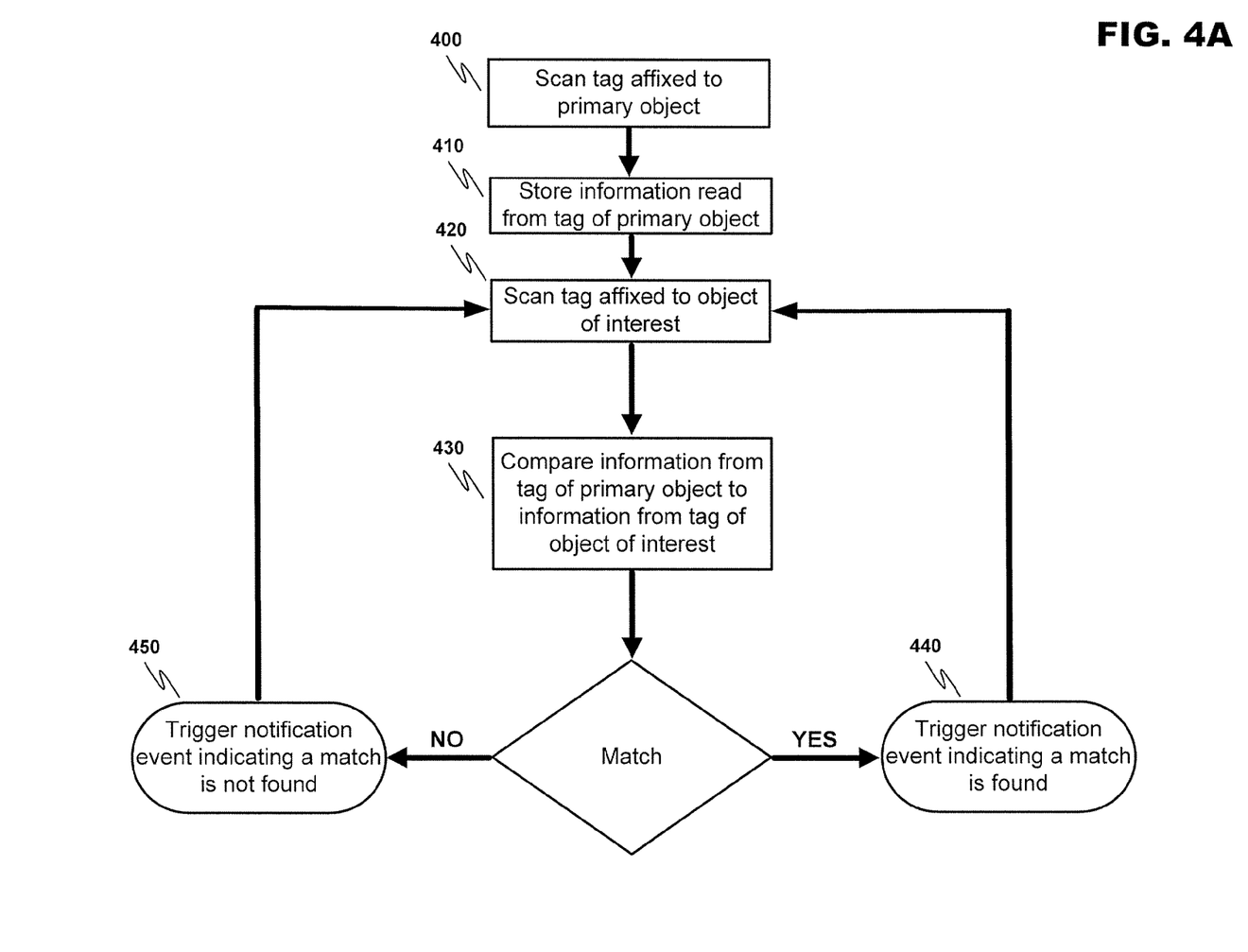
FIG. 4A discloses an exemplary flowchart for a process of determining compatibility between various items in accordance with at least one embodiment of the present invention.

FIG. 4a discloses an exemplary process flowchart, in accordance with at least one embodiment of the present invention, for determining the compatibility between a primary object and one or more other objects based on matching criteria. The matching criteria may include, for example, comparing the information stored in machine-readable tags affixed to the objects. In step 400, WCD 100 may be utilized to scan a machine-readable tag affixed to a primary object. Alternatively, or in addition to scanning the tags, WCD 100 may communicate with the tags or objects to which the tags are affixed via NFC peer-to-peer communication, e.g. using the NFCIP-1 standard. For example, the NFC Data Exchange Format (NDEF) specification defines a message encapsulation format to exchange information, e.g. between an NFC Forum Device and another NFC Forum Device or an NFC Forum Tag. Standard NDEF messages may be created for particular matching criteria such that, for example when a tag is scanned, it may respond with a standard message, and WCD 100 may interpret the standard message to mean, for example, that the scanned item is compatible with a certain type of device.

Upon scanning the tag, WCD 100 may in step 410, store the information read from the tag. Next, in step 420 WCD 100 may once again be utilized to scan a machine-readable tag affixed to an object of interest. In step 430, WCD 100 may determine compatibility between the objects by comparing the information stored in one or more information fields of the tag affixed to the primary object to the information stored in one or more information fields of the tag affixed to the object of interest. If at least a partial match is found, step 440 will trigger a notification event in WCD 100 indicating that a match is found between the tags and the process will continue to step 420 where more tags may be scanned. If however, a match is not found, step 450 will trigger a notification event in WCD 100 indicating that a match is not found between the tags and the process will continue to step 420 where more tags may be scanned.

To illustrate by way of example, a user who visits a hardware store to purchase a particular tool and the associated accessories which are compatible with the particular tool may, in accordance with at least one embodiment, touch or scan the tag affixed to the tool using WCD 100 and subsequently touch or scan the tags affixed to the accessories which are of interest to him. WCD 100 may then compare the information read from the tags and determine if the accessories are compatible with the tool. If a match (i.e., if the information relating to the tool corresponds to the information relating to the accessories) is found, WCD 100 may trigger an event such as playing a sound and/or displaying a notification to inform the user of the match.

Other examples which may utilize the principles of the present invention may include a cook book including tags for recipes. A tag for a recipe may include a list of ingredients in one or more of the information fields of the tag. A user who is shopping for ingredients required by the recipe may first scan the tag for the recipe and subsequently scan tags affixed to the ingredients of interest to determine if the ingredients correspond with the ingredients listed in the recipe. If a match is found, WCD 100 may trigger an event such as playing a sound and/or displaying a notification to inform the user of the match.

A further example includes a tag affixed to an automobile including a list of compatible parts in one or more of the information fields of the tag. A user searching for spare or replacement parts for the automobile may simply scan the tag affixed to the automobile and the tag affixed to the part in question to determine if the part is compatible with his car. If a match is found, WCD 100 may trigger a notification event to inform the user of the match FIG. 4B discloses an exemplary process flowchart, in accordance with at least one embodiment of the present invention, for determining the compatibility between a primary object and one or more other objects based on matching criteria. The matching criteria may include, for example, comparing the information stored in machine-readable tags affixed to the objects. In step 400, WCD 100 may be utilized to scan a machine-readable tag affixed to a primary object. Next, in step 420 WCD 100 may once again be utilized to scan a machine-readable tag affixed to an object of interest. Alternatively, or in addition to scanning the tags, WCD 100 may communicate with the tags or objects to which the tags are affixed via NFC peer-to-peer communication, e.g. using standard NDEF messages as described in the description of FIG. 4A. In step 425, WCD 100 may transmit the information read from the tags to a remote resource (not shown) such as for example a PC, a server, etc. which may determine the compatibility between the objects based on matching criteria.

Figure 4B:
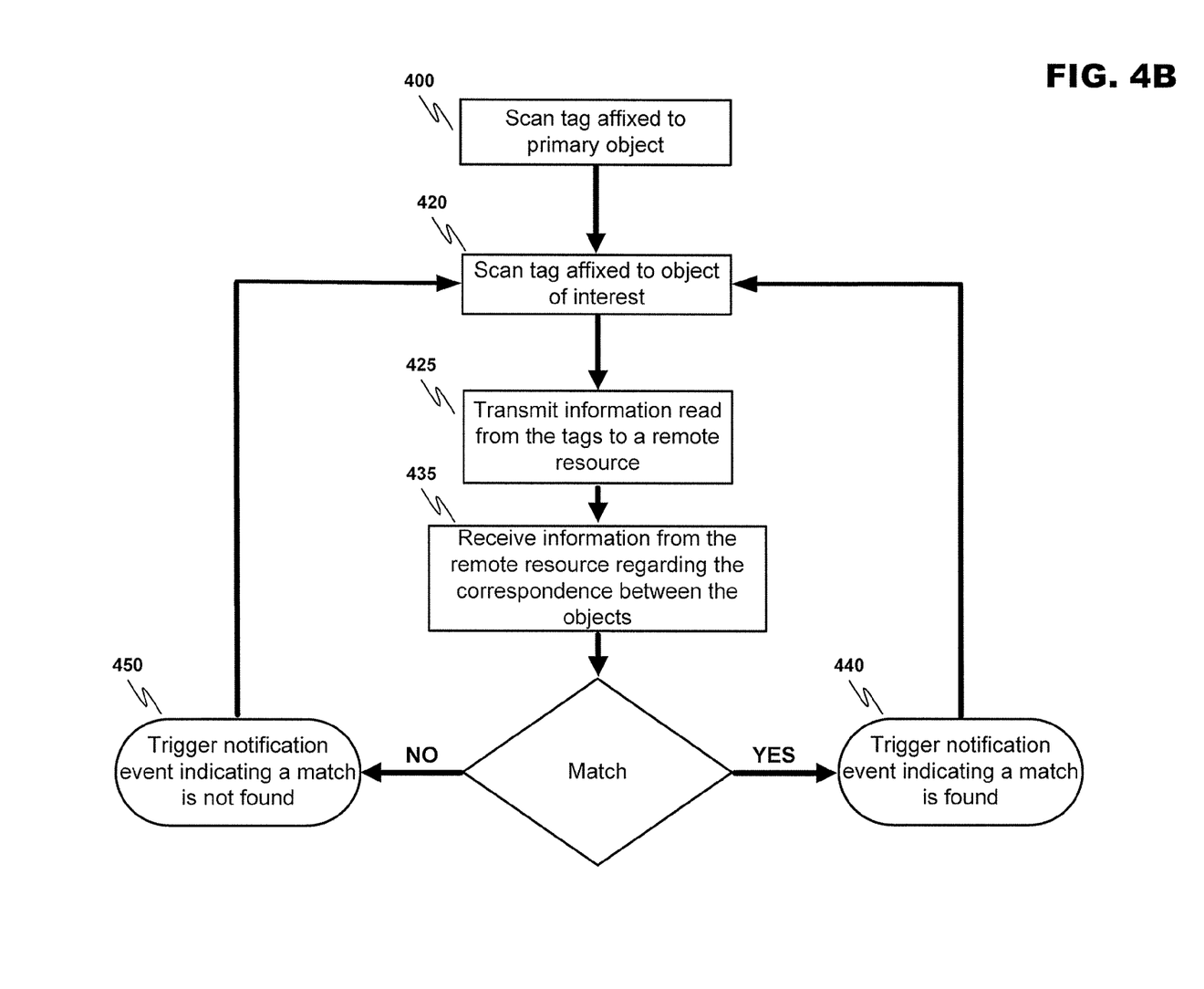
FIG. 4B discloses an exemplary flowchart for a process of determining compatibility between various items in accordance with at least one embodiment of the present invention.

The matching criteria may be generated using for example, sales statistics. For example, sales statistics indicating purchase patterns of customers (e.g., customers who bought a certain product very often also bought another particular product) may be utilized to determine compatibility between the objects. For example, if the sales statistics indicate that most customers who bought the primary object also bought the object of interest, then the remote resource may determine that the objects are compatible. Alternatively, or in addition, the remote resource may determine compatibility based on the comparison between the information stored in the machine readable tags (e.g., compare the information stored in one or more information fields of the tag affixed to the primary object to the information stored in one or more information fields of the tag affixed to the object of interest). Once the remote resource determines the degree of compatibility (e.g., fall match or partial match) between the objects, the remote resource may transmit information indicating the result to WCD 100.

Next, in step 435 WCD 100 receives the information from the remote resource regarding the correspondence or compatibility between the objects and if at least a partial match is found, step 440 will trigger a notification event in WCD 100 indicating that a match is found between the tags and the process will continue to step 420 where more tags may be scanned. If however, a match is not found, step 450 will trigger a notification event in WCD 100 indicating that a match is not found between the tags and the process will continue to step 420 where more tags may be scanned.

It should be noted that in order to implement the principles of the present invention, identification information of various products, at least within specific product categories such as computer, food, automotive, etc., would need to be standardized in a way such that the identification information would be based on criteria which are common to every tag. For such purposes, EPCglobal™ has standardized Electric Product Code (EPC). An EPC tag may include information fields which store identification information, characteristic information, compatibility information, etc. A further example includes Universal Product Code (UPC) which is a barcode symbology (i.e., a specific type of barcode) widely used in the U.S. and Canada to track items.

Figure 5:
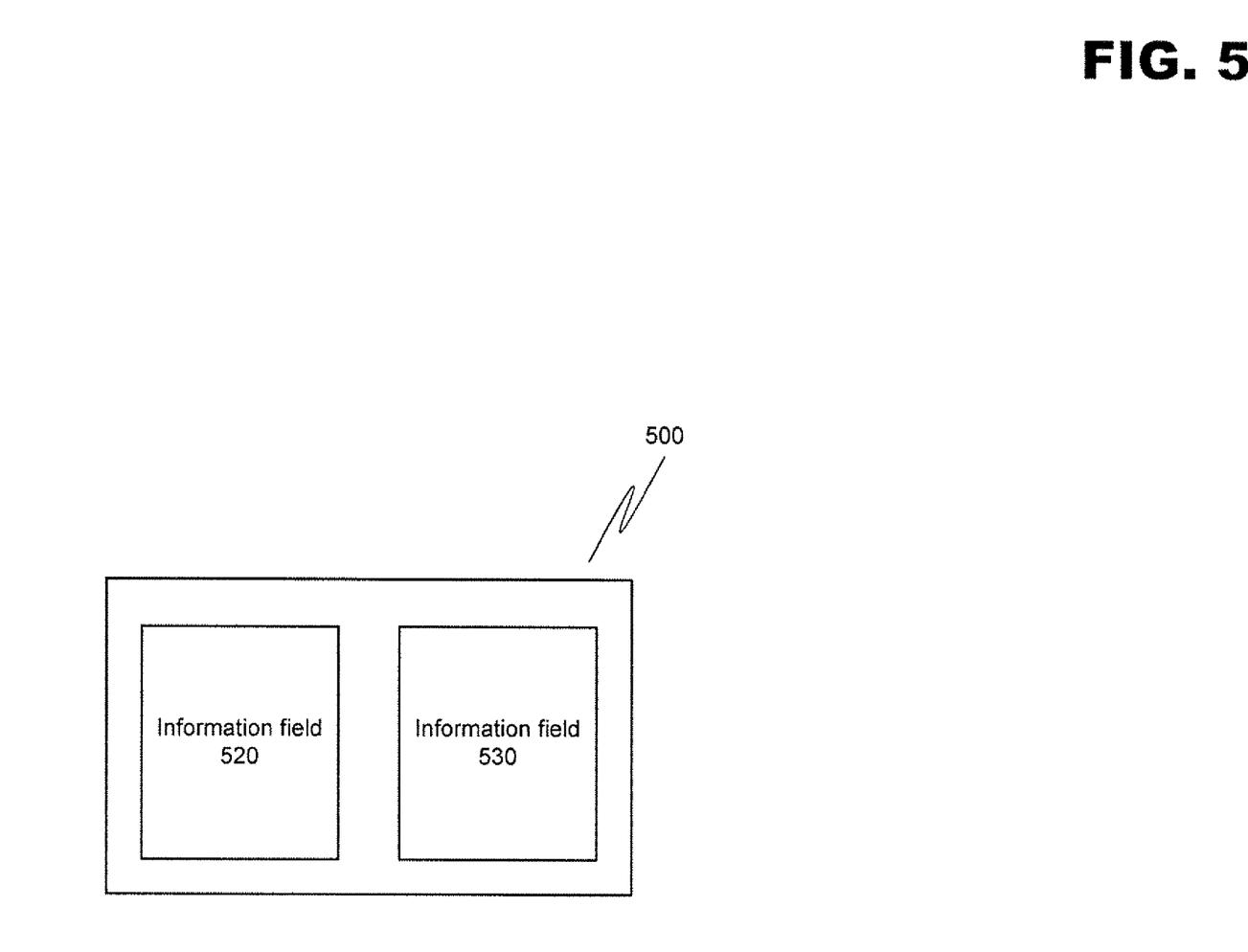
FIG. 5 discloses an exemplary structural description of a machine-readable tag in accordance with at least one embodiment of the present invention.

FIG. 5 discloses an exemplary machine-readable tag usable with at least one embodiment of the present invention. Tag 500 may be a RFID tag, a bar code, etc., that may include two or more information fields, such as for example, information fields 520 and 530 as illustrated in FIG. 5. It should noted that the present invention is not intended to be limited to any particular tag arrangement, so embodiments which include only one information filed holding all of the information may be imaginable. Information field 520 may include identification information relating to the primary item or object to which the tag is affixed and information field 530 may include association information relating to objects or items which may be compatible or used with the primary object. In accordance with at least one embodiment, association information may include identification information of compatible objects or items, compatibility information identifying a group or class of devices, characteristic information of compatible objects or items, etc.

Accordingly, it will be apparent to persons skilled in the relevant art that various changes in form and detail can be made therein without departing from the spirit and scope of the invention. The breadth and scope of the present invention should not be limited by any of the above-described exemplary embodiments, but should be defined only in accordance with the following claims and their equivalents.

What is claimed:

1. An apparatus comprising:
a scanner configured to read machine-readable tags; and
a processor coupled to the scanner, the processor being configured to:
scan information from a tag associated with a primary item, the scanned information being configured to set at least one selection criteria in the apparatus;
scan information from one or more tags associated with one or more other items, the scanned information including at least characteristic information about the one or more other items;
evaluate the selection criteria in view of the characteristic information; and
trigger an event in the apparatus if the primary item is compatible with the one or more other items based on the evaluation.

2. The apparatus according to claim 1, wherein the processor being configured to evaluate the selection criteria in view of the characteristic information comprises the processor being further configured to compare the selection criteria against the characteristic information in the apparatus.

3. The apparatus according to claim 1, wherein the processor being configured to evaluate the selection criteria in view of the characteristic information comprises the processor being further configured to transmit the information read from the tag associated with the primary item and the information read from the one or more tags associated with the one or more other items to a remote resource, the remote resource being configured to compare the selection criteria against the characteristic information.

4. The apparatus according to claim 3, wherein the processor is further configured to receive the result of the compatibility determination from the remote resource.

5. The apparatus according to claim 1, wherein the at least one selection criteria includes at least identification information of the primary item associated with the tag.

6. The apparatus according to claim 1, wherein the at least one selection criteria includes at least identification information of one or more items which may be compatible with the primary item.

7. The apparatus according to claim 1, wherein triggering an event in the apparatus requires that the characteristic information matches at least a part of the selection criteria.

8. The apparatus according to claim 1, wherein the scanner is a RFID scanner.

9. An apparatus comprising:
means for scanning information from a machine-readable tag associated with a primary item, the scanned information being configured to set at least one selection criteria;

means for scanning information from one or more machine-readable tags associated with one or more other items, the information read from the one or more machine-readable tags including at least characteristic information about one or more other items;

means for evaluating the selection criteria with the characteristic information; and means for triggering an event if the primary item is compatible with the one or more other items.

10. A method comprising:

scanning information from a machine-readable tag associated with a primary item, the scanned information being configured to set at least one selection criteria;

scanning information from one or more machine-readable tags associated with one or more other items, the information read from the one or more machine-readable tags including at least characteristic information about one or more other items;

evaluating the selection criteria with the characteristic information; and triggering an event if the primary item is compatible with the one or more other items based on the evaluation.

11. The method according to claim 10, wherein evaluating the selection criteria in view of the characteristic information further comprises to comparing the selection criteria against the characteristic information.

12. The method according to claim 10, wherein evaluating the selection criteria in view of the characteristic information comprises further comprises transmitting the information read from the tag associated with the primary item and the information read from the one or more tags associated with the one or more other items to a remote resource, the remote resource being configured to compare the selection criteria against the characteristic information.

13. The method according to claim 12 further comprising receiving, from the remote resource, the result of the compatibility determination.

14. The method according to claim 10, wherein the at least one selection criteria includes at least identification information of the primary item associated with the tag.

15. The method according to claim 10, wherein the characteristic information includes at least identification information of one or more items which may be compatible with the primary item.

16. The method according to claim 10, wherein triggering an event in the apparatus requires that the characteristic information matches at least a part of the selection criteria.

17. A computer executable program code recorded on a non-transitory computer readable storage medium, the computer executable program code comprising program product comprising a computer usable medium having computer readable program code embodied in said medium comprising:

a computer readable program code configured to scan information from a machine-readable tag associated with a primary item, the scanned information being configured to set at least one selection criteria;

a computer readable program code configured to scan information from one or more machine-readable tags associated with one or more other items, the information read from the one or more machine-readable tags including at least characteristic information about one or more other items;

a computer readable program code configured to evaluate the selection criteria with the characteristic information; and a computer readable program code configured to trigger an event if the primary item is compatible with the one or more other items based on the evaluation.

18. The computer program product according to claim 17, wherein evaluating the selection criteria in view of the characteristic information further comprises to comparing the selection criteria against the characteristic information.

19. The computer program product according to claim 17, wherein evaluating the selection criteria in view of the characteristic information comprises further comprises transmitting the information read from the tag associated with the primary item and the information read from the one or more tags associated with the one or more other items to a remote resource, the remote resource being configured to compare the selection criteria against the characteristic information.

20. The computer program product according to claim 19, further comprising a computer readable program code configured to receive, from the remote resource, the result of the determination.

21. The computer program product according to claim 17, wherein the at least one selection criteria includes at least identification information of the primary item associated with the tag.

22. The computer program product according to claim 17, wherein the characteristic information includes at least identification information of one or more items which may be compatible with the primary item.

23. A system comprising:

an apparatus including a scanner configured to read information from machine-readable tags;

a primary tag associated with a primary item;

one or more other tags associated with one or more other items;

the apparatus scanning information from the primary tag, the scanned information being configured to set at least one selection criteria in the apparatus;

the apparatus further scanning information from the one or more other tags, the scanned information including at least characteristic information about the one or more other items;

the apparatus further evaluating the selection criteria in view of the characteristic information; and the apparatus further triggering an event if the primary item is compatible with the one or more other items based on the evaluation.

24. The system according to claim 23, wherein the apparatus evaluating the selection criteria in view of the characteristic information comprises the apparatus transmitting the information read from the tag associated with the primary item and the information read from the one or more tags associated with the one or more other items to a remote resource, the remote resource being configured to compare the selection criteria against the characteristic information.

25. The system according to claim 24, wherein the apparatus is further configured to receive, from the remote resource, the result of the determination.

26. The system according to claim 23, wherein the at least one selection criteria includes at least identification information of the primary item associated with the tag.

27. The system according to claim 23, wherein the characteristic information includes at least identification information of the one or more items which may be compatible with the primary item.

* * * * *

UNITED STATES PATENT AND TRADEMARK OFFICE
CERTIFICATE OF CORRECTION

PATENT NO. : 7,868,762 B2  Page 1 of 1
APPLICATION NO. : 11/954750
DATED : January 11, 2011
INVENTOR(S) : Hartwig et al.

It is certified that error appears in the above-identified patent and that said Letters Patent is hereby corrected as shown below:

Column 11

Line 29, "comprises further comprises transmitting" should read, --comprises transmitting--;
Lines 50-53, please delete "program product comprising a computer usable medium having computer readable program code embodied in said medium comprising".

Column 12

Line 4, "computer program product according" should read, --computer executable program code according--;
Line 8, "computer program product according" should read, --computer executable program code according--;
Line 10, "information comprises further comprises" should read, --information comprises--;
Line 16, "computer program product according" should read, --computer executable program code according--;
Line 20, "computer program product according" should read, --computer executable program code according--;
Line 24, "computer program product according" should read, --computer executable program code according--.

Signed and Sealed this
Twenty-fourth Day of May, 2011

David J. Kappos
*Director of the United States Patent and Trademark Office*